Nov. 1, 1966  M. P. AHO  3,282,198
GREASE-CIRCULATING ATTACHMENT FOR DEEP FAT FRIERS
Filed April 26, 1965  2 Sheets-Sheet 1
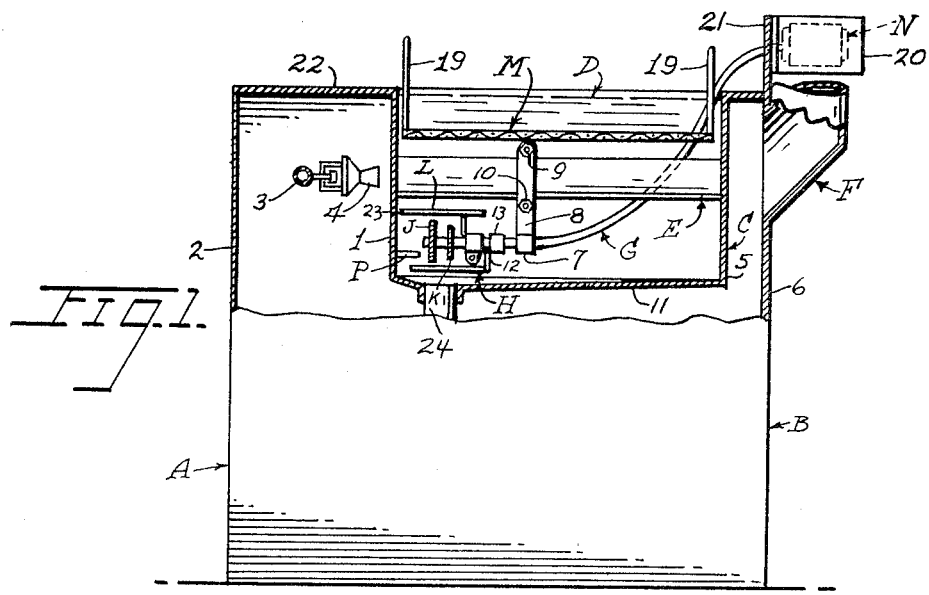
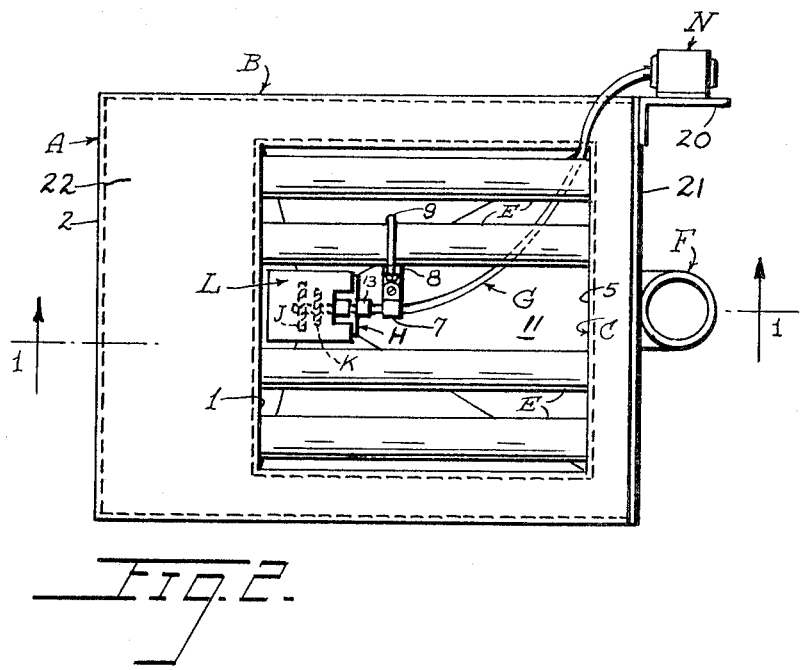
INVENTOR
MARTIN PAUL AHO
BY William R. Piper
ATTORNEY Nov. 1, 1966                    M. P. AHO                    3,282,198
              GREASE-CIRCULATING ATTACHMENT FOR DEEP FAT FRIERS
Filed April 26, 1965                                    2 Sheets-Sheet 2
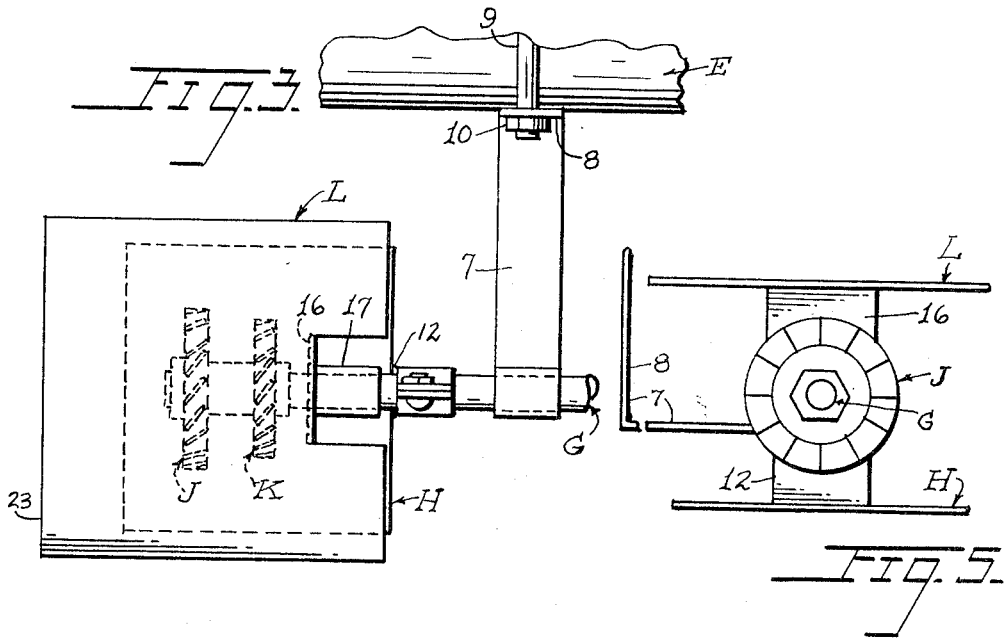
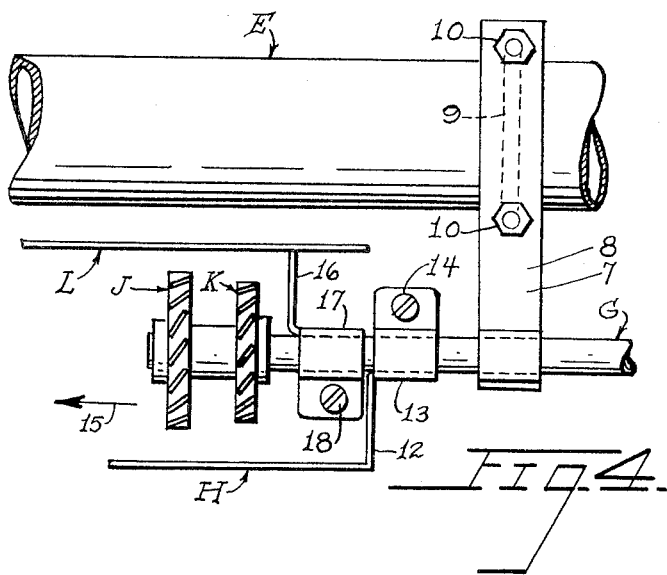
INVENTOR
MARTIN PAUL AHO
BY William R. Piper
ATTORNEY

United States Patent Office 3,282,198
Patented Nov. 1, 1966

3,282,198
GREASE-CIRCULATING ATTACHMENT FOR
DEEP FAT FRIERS
Martin Paul Aho, 3048 Partridge Ave.,
Oakland, Calif.
Filed Apr. 26, 1965, Ser. No. 450,921
2 Claims. (Cl. 99—403)

The present invention relates to improvements in a grease-circulating attachment for deep fat friers, and it consists in the combination, construction and arrangement of parts as hereinafter described and claimed.

In the usual deep fat frier for cooking donuts and the like, a plurality of grease heating tubes extend through the grease in the container and these tubes or pipes have their ends extending through opposed walls of the container and communicating with the interior of the casing that surrounds the container. Gas flames are directed into the entrance ends of the tubes and the air in the tubes is heated and in turn will heat the tubes. The tubes or pipes are surrounded by the grease in the container and will heat this grease.

The ideal temperature of the grease for cooking donuts is 375° F. I have found that when the temperature at the top of the grease is raised to this temperature, the temperature lower down in the body of grease will be cooler than the desired 375° F. As donuts are placed into this grease, the cradle and the donut screen immediately stir the grease producing a colder body of grease. Any donuts being cooked in this lower temperature grease will absorb too much grease before the cooking process is completed and the donuts will therefore have an oily taste.

An object of my invention is to provide a grease circulating attachment which can be readily mounted in the usual deep fat frier and it will circulate the heated grease so that the entire body of grease will have a uniform temperature. If the temperature of the grease is to be 375° F. for cooking the donuts then the thermostat-controlled switch can be set for this degree of heat and the variable speed motor for operating the grease-circulating attachment will circulate the grease in the grease container at a speed which will maintain the entire body of grease at this uniform temperature.

I have found that the impellers used for circulating the liquid must be rotated at a certain speed to circulate the liquid grease fast enough to maintain a uniform temperature throughout the entire body of grease. This speed causes the impellers to move some of the grease upwardly in the grease container and toward the surface so as to agitate the grease surface. Any donuts being deep fat fried and floating on the surface of the grease will be bounced around due to this surface agitation. It is difficult to turn over such bouncing donuts in order to cook them on the other side.

A further object of my invention is to provide upper and lower baffles for the impellers that will prevent the initial vertical movement of the liquid grease produced by the impellers from moving directly upwardly to agitate the surface. Instead the baffles direct the moving grease, forwardly from the impellers toward the front of the container. This results in no agitation to the surface of the grease. Yet there is a sufficient movement or circulation in the body of grease to maintain a uniform temperature throughout.

The grease-circulating attachment is designed to be used in all deep fat friers that employ heating tubes or pipes. The device is operated by a variable speed motor that can be adjausted to rotate the impellers at a desired speed for circulating the liquid grease to maintain a uniform temperature throughout. The donuts will be perfectly cooked if each side of the donuts are cooked for about forty-five seconds.

When yeast-raised donuts are cooked, some of the flour covering the donuts will drop to the bottom of the grease container. This flour might become burnt through overheating and it should be kept at the container bottom so as not to contaminate the surface of the liquid grease where the donuts are being cooked. The baffles will prevent the undue circulation of the grease that would carry the cooked flour to the top of the grease. There is no undue movement of the grease at the top and bottom of the body of grease at any time.

The thermostat for controlling the temperature of the grease will respond more quickly when the entire body of grease is maintained at a uniform temperature at all times. The baffles make the thermostat more sensitive than when the circulation of grease is accomplished without the use of baffles.

Other objects and advantages will appear as the specification continues. The novel features of the invention will be set forth in the appended claims.

Drawings

For a better understanding of my invention, reference should be made to the accompanying drawings, forming part of this specification, in which:

FIGURE 1 is a longitudinal section through a deep fat frier and shows my invention operatively applied thereto. The section is taken substantially along the line 1—1 of FIGURE 2.

FIGURE 2 is a top plan view of the deep fat frier and shows my device operatively applied in place.

FIGURE 3 is a top plan view of a part of the device and is shown approximately one-half full size.

FIGURE 4 is a side elevation of FIGURE 3.

FIGURE 5 is a front elevation of FIGURE 4.

While I have shown only the preferred form of my invention, it should be understood that various changes, or modifications, may be made within the scope of the annexed claims without departing from the spirit thereof.

Detailed description

In carrying out my invention, I make use of a deep fat frier indicated generally at A in FIGURES 1 and 2. This device comprises an outer casing B and a container C for holding grease D. The front wall 1 of the container C is spaced from the front wall 2 of the casing B so as to provide space for a gas pipe 3 and a plurality of gas burners 4 that communicate with the gas pipe. The gas burners are aligned with grease heating tubes E and FIGURE 2 shows four of these tubes in the container although I do not wish to be confined to any particular number.

The tubes have their front ends supported by the front wall 1 of the grease container C and have their rear ends supported by the rear wall 5 of the container. The rear wall 5 is spaced from the rear wall 6 of the outer casing B and the heat of the gas flames from the burners 4 will flow through the tubes for heating them and then will exhaust into the space between these walls 5 and 6. The gases of combustion will then flow into an exhaust flue F. A damper, not shown, may be used in the exhaust flue.

FIGURE 2 shows the two innermost tubes E as being spaced a sufficient distance from each other so that the grease circulating attachment can be disposed between these tubes and near the front wall 1 of the container C, see also FIGURE 1. The grease circulating attachment is shown on a larger scale in FIGURES 3, 4 and 5 and it will be noted that a flexible shaft housing G has one end supported by a bracket 7, this bracket being L-shaped and having its upstanding arm 8 secured to the adjacent tube or pipe E by a U-shaped bolt 9. Both FIGURES 2 and 4 show nuts 10 applied to the threaded ends of the U-shaped bolt 9 for securing the bracket 7 to the tube E.

The housing G for the flexible shaft supports a lower baffle H, see FIGURE 4. This baffle has a flat portion that is held in a horizontal position within the container C and near to the bottom wall 11 of the container, see FIGURE 1. The lower baffle H has an upstanding portion 12 that is formed into a clamp 13, see FIGURE 4, and this clamp is secured to the housing G of the flexible shaft by means of a bolt 14.

The lower baffle H is spaced below a pair of impellers J and K. These impellers are keyed to the flexible shaft that is enclosed in the flexible housing G so as to be rotated thereby. The impeller J is slightly larger in diameter than the impeller K and when these impellers are rotated, they will cause the liquid grease to flow to the left in FIGURE 4 as indicated by the arrow 15.

An upper baffle L is larger in area than the lower baffle H and is spaced above the two impellers J and K. The upper baffle L has a central rear portion 16 that is bent downwardly as shown in FIGURE 4 and is provided with an integral clamp 17. The clamp is mounted on the housing G for the flexible shaft and is held in place by a bolt 18. The central rear portion 16 is made more narrow than the width of the upper baffle so that there will be less vertical portion for impeding the horizontal flow of the liquid grease adjacent to the impellers.

The two horizontally positioned baffles H and L will prevent the grease circulated by the impellers J and K from moving directly upwardly in the container C and therefore the flowing grease will not agitate the surface of the grease. This is important because when donuts are being fried they will float on the top of the grease and if the upper surface is agitated, the donuts will bob around and it will be difficult to turn them.

The usual deep fat frier is provided with a flat screen M that has substantially the same area as that of the grease container C. The screen M has handles 19 at opposite ends and the tops of these handles extend above the grease so that an operator can grasp them for lifting the screen out of the heated grease or for lowering the screen back into place.

FIGURES 1 and 2 show the flexible shaft housing G as extending to one of the rear corners of the container C and then the housing projects above the top of the container and the flexible shaft within the housing is connected to an electric motor N. The motor is mounted on a bracket 20 which in turn is secured to an upstanding back porton 21 of the rear wall 6 of the outer casing B. The upstanding portion 21 also extends above the top 22 of the outer casing B. The screen M is not shown in FIGURE 2.

*Operation*

From the foregoing description of the various parts of the device, the operation thereof may be readily understood. The grease circulating attachment is secured to one of the center tubes E by the bracket 77 and the U-shaped bolt 9. The operator disposes the baffles H and L in the space between the two center grease heating tubes or pipes E and positions the front edge 23 of the upper baffle L about one-half of an inch from the inner surface of the front wall 1 of the container C. The lower baffle H will overlie the bottom 11 of the grease container C and will also overlie a drain pipe 24 for the container, see FIGURE 1.

When the electric motor N is connected to a source of current, not shown, it will rotate the impellers J and K for moving the grease adjacent to the impellers to the left in FIGURE 1. The electric motor N is of a variable speed type and the operator can control the speed for causing a desired rate of grease flow for maintaining the body of grease at a uniform temperature of about 375° which is ideal for cooking donuts. A thermostat P extends into the interior of the casing C as shown in FIGURE 1 and this will control the flow of gas to the burners 4 so as to cause the gas flames to heat the tubes E to the desired extent for maintaining a constant grease temperature. The baffles H and L will direct the flow of grease forwardly from the impellers as shown by the arrow 15 in FIGURE 4 and will prevent an upward flow that will agitate the surface of the grease. The baffles will prevent undue movement of the grease at the bottom of the grease container.

I claim:
1. The combination with a deep fat fryer including
   (a) a grease container including a bottom and a plurality of side walls; and
   (b) grease heating tubes extending substantially horizontally through said container between two of said walls; of
   (c) a pair of horizontal and vertically spaced apart upper and lower baffles; the upper baffle being positioned near said tubes and having an edge spaced from one of said walls;
   (d) said lower baffle being spaced above the bottom of said grease container and having an edge spaced from said one side wall a distance greater than the distance said first baffle edge is spaced from said one side wall;
   (e) at least one impeller mounted between said baffles and having its axis extending substantially perpendicular to said one side wall of said container; and
   (f) means for rotating said impeller for causing it to move the grease in the container toward said one side wall in sufficient volume to maintain the entire body of grease in movement so that the grease will be at a uniform temperature throughout;
   (g) the upper baffle preventing the immediate upward flow of grease from the impeller to the surface of the grease and thus preventing the ruffling of the grease surface;
   (h) the lower baffle preventing the immediate downward flow of grease from the impeller to the container bottom and thus preventing sediment from being picked up from the bottom;
   (i) the two baffles directing the grease flow to the wall and spreading the grease so that it will maintain the entire body of grease in a gentle movement and
   (j) means to support said baffles in said container.
2. The combination as set forth in claim 1, and in which
   (a) a flexible cable rotates said impeller; said cable being rotatably mounted within a housing;
   (b) said upper baffle having a depending cut-out portion that is secured to said cable housing;

(c) said lower baffle being smaller than said upper baffle and having a bent up portion that is secured to said cable housing; and
(d) means for securing the portion of said cable housing, that is near to said impeller, to said grease heating tubes;
(e) said means to support said baffles consisting of said cut-out portion, said bent up portion and said cable housing securing means.

References Cited by the Examiner
UNITED STATES PATENTS

| | | | |
|---|---|---|---|
| 1,079,247 | 11/1913 | Hussong | 259—97 |
| 1,774,509 | 9/1930 | Gould | 259—102 |
| 2,527,430 | 10/1950 | Kniveton | 126—381 X |
| 2,535,905 | 12/1950 | Dawson | 99—408 |
| 2,663,236 | 12/1953 | Blankenship et al. | 259—97 X |
| 2,678,039 | 5/1954 | Keating | 126—391 |
| 3,053,265 | 9/1962 | Erie | 99—406 X |
| 3,060,922 | 10/1962 | Wilson | 99—408 X |
| 3,218,959 | 11/1965 | Swisher | 99—409 |

FOREIGN PATENTS

| | | |
|---|---|---|
| 1,280,209 | 11/1961 | France. |

WALTER A. SCHEEL, *Primary Examiner.*

BILLY J. WILHITE, *Examiner.*